(12) United States Patent
Baldes et al.

(10) Patent No.: US 8,615,321 B2
(45) Date of Patent: Dec. 24, 2013

(54) METHOD AND DEVICE FOR AUTOMATED PALLETIZING OF PACKAGES

(75) Inventors: Lars Baldes, Augsburg (DE); Gerda Ruge, Augsburg (DE); Julian Haselmayr, Augsburg (DE)

(73) Assignee: Kuka Roboter GmbH, Augsburg (DE)

( * ) Notice: Subject to any disclaimer, the term of this patent is extended or adjusted under 35 U.S.C. 154(b) by 967 days.

(21) Appl. No.: 12/715,432

(22) Filed: Mar. 2, 2010

(65) Prior Publication Data
US 2010/0249988 A1   Sep. 30, 2010

(30) Foreign Application Priority Data
Mar. 2, 2009   (DE) .......................... 10 2009 011 295

(51) Int. Cl.
*G06F 7/00*   (2006.01)

(52) U.S. Cl.
USPC .......... 700/213; 700/214; 700/215; 700/216; 700/217; 414/799

(58) Field of Classification Search
None
See application file for complete search history.

(56) References Cited

U.S. PATENT DOCUMENTS

| | | | |
|---|---|---|---|
| 5,794,416 A * | 8/1998 | Rahman | 53/540 |
| 5,908,283 A | 6/1999 | Huang et al. | |
| 2004/0165980 A1 * | 8/2004 | Huang et al. | 414/799 |

* cited by examiner

*Primary Examiner* — Yolanda Jones
(74) *Attorney, Agent, or Firm* — Schiff Hardin LLP

(57) ABSTRACT

In a method for automated palletizing of packages, in particular by means of a manipulator, packages are arranged on the edge of a loading area and, if possible, a virtual initial layer of multiple packages is initially generated and this layer is then centered relative to the loading area.

12 Claims, 1 Drawing Sheet

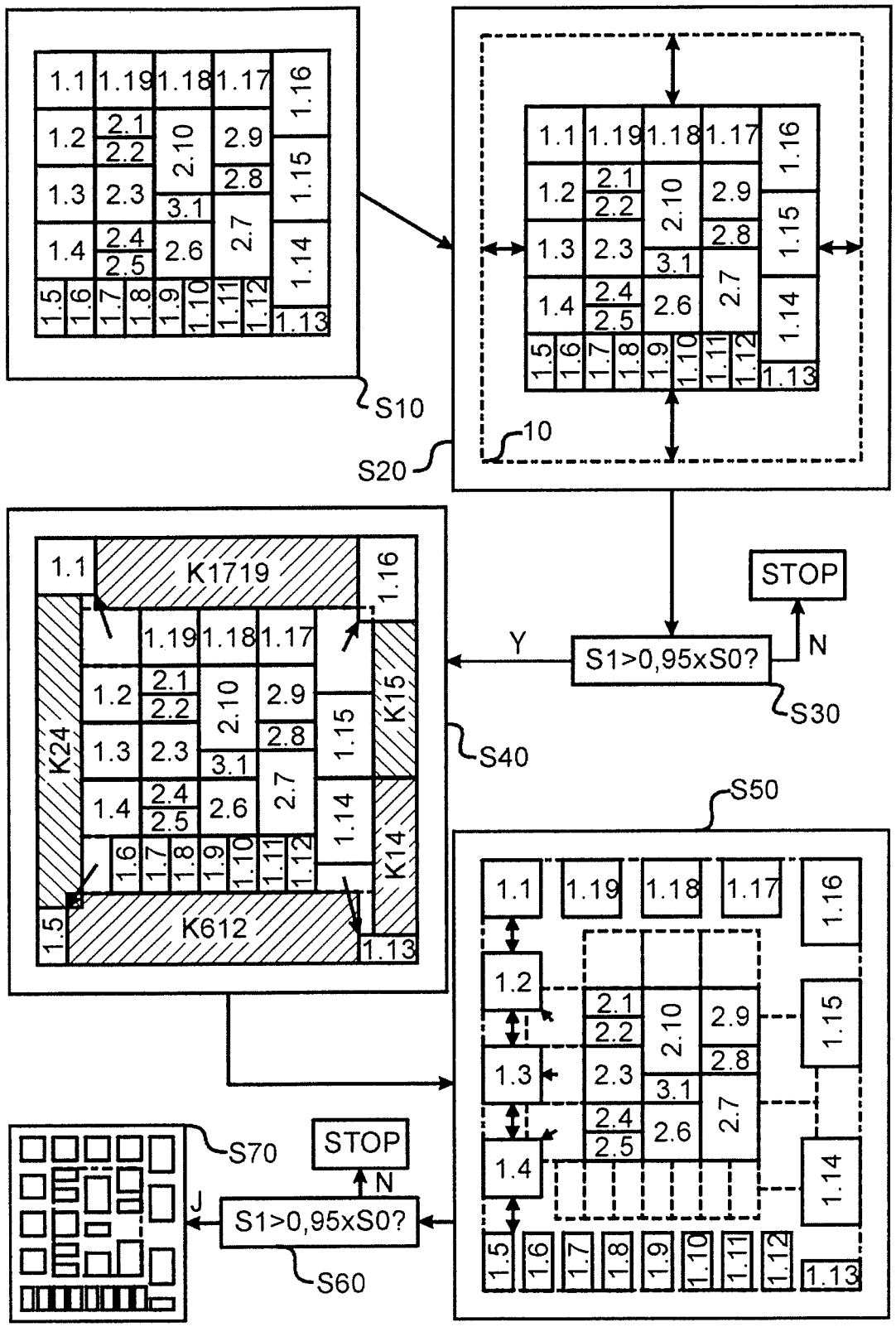

METHOD AND DEVICE FOR AUTOMATED PALLETIZING OF PACKAGES

BACKGROUND OF THE INVENTION

1. Field of the Invention

The present invention concerns a method and a device to automatically palletize packages, in particular by means of a manipulator, for example an industrial robot.

2. Description of the Prior Art

In particular for the automatic stacking of individual goods or goods bundles (what are generally called packages in the following) on a predetermined loading area (for example a limited storage space), a loading means (for example a pallet) or a transport means (for example a continuous transporter) by means of an industrial robot or automatic palletizing machine (i.e. the palletizing of packages into a package stack), it is necessary to plan the arrangement of the packages in the stack in that a palletizing or loading pattern is generated.

For this purpose, EP 1 211 203 B1 discloses a method in which an initial position of the free space remaining between already present packages is subdivided into polygonal sub-spaces. Delivered virtual packages are then initially successively positioned on the edge of a suitable sub-space in the delivery order or from a buffer and are subsequently shifted further as necessary in order to improve the stability of the stack that is created. The position that is successively created in this way is disadvantageous since the positioning of the individual packages essentially depends on the free space of the initial layer.

SUMMARY OF THE INVENTION

An object of the present invention is to improve the automatic palletizing of packages.

The method according to the invention is particularly suitable for the automated palletizing of different packages with different dimensions into a mixed package stack. To generate a loading pattern, virtual packages are thereby arranged at the edge of a loading area insofar as boundary conditions (for example the stability of the package stack generated in such a way) that are to be taken into account allow this.

In contrast to the method of the aforementioned EP 1 211 203 B1, according to the invention a virtual initial layer of multiple packages arranged next to and/or atop one another is initially generated. These can in particular be planned packed densely and/or according to other criteria, for example the stability, weight distribution, goods distribution or the like. For example, specific packages of different goods types can be distributed in a predetermined manner to palletize a sales pallet. For instance, boxes with different beverage types can be mixed in a desired manner in an initial layer of a drink box pallet.

In the following step this position is centered as a whole relative to a predetermined loading area, for example a pallet, a storing position or a different position of a package stack that has already been partially generated. This centering can be implemented, for example, by minimizing a distance between the center of gravity or the geometric center point of the initial layer and the center of gravity or the geometric center point of the loading area, by maximizing a minimum distance of an outer contour or envelope of the initial layer relative to an edge of the loading area, or by minimization of a different distance measurement, for example the sum of the minimum separations of parallel segments of initial layers and loading area edge (for instance by determining a Pareto-optimal solution).

Because the virtual initial layer is generated first and is only subsequently arranged as a whole on the loading area, the position can initially be planned and advantageously optimized independent of the loading area (in particular a free space or underlying layer).

Packages of the centered layer (in particular outer or edge packages of this layer, preferably also additionally inner packages of the layer) can subsequently be spaced apart from one another on the loading area such that packages are arranged at the edge of the loading area. All outer packages of the layer are thereby advantageously arranged on the edge of the loading area, insofar as this is possible.

For this purpose, in a preferred embodiment corner packages of the centered layer are arranged in corners of the loading area in order to maximally utilize these. Subsequently, or if bypassing this step, corridors are defined at the edge of the loading area, and one or more outer packets of the centered layer are arranged individually or in groups in these corridors at the edge of the loading area, wherein the packages in a corridor are advantageously distributed equidistantly or, respectively, individual packages are centered in the corridor. These steps can also be repeated in multiple recursions in that, for example, after the corner packages of the centered layer have initially been arranged in corners of the loading area, respective corridors are subsequently determined for the packages or package groups now situated at the ends of an edge row, and these are centered in the corridors at the loading area edge so that the packages of one edge row of the layer are successively shifted from the outside inward in respective, newly generated corridors at the edge of the loading area.

After arrangement of the edge packages of the layer at the edge of the loading area, the method described above can be repeated for the inner partial layer remaining after removal of its original edge packages, wherein the now-outlying packages are defined as new edge packages and the portion of the loading area (advantageously minus an edge strip that is to be kept free and that determines the distance between two package rows of the layer) that is available within the packages arranged at the edge of the loading area is defined as a new loading area, or even by a simulated repulsion of all inward packages with the same or different forces (for example dependent on the measurements of the respective packages), in a preferred development all package's or a portion of the inner packages of the centered layer are distributed individually or in groups within the outer packages of the layer that are arranged at the edge of the loading area.

After the virtual centering, the virtual distribution of the edge packages at the edge of the loading area and/or the virtual distribution of the inner packages, a characteristic stability value is preferably determined with regard to the layer modified in this way and is compared with a limit value, wherein the respective method step is only accepted if the characteristic stability value falls below the limit value. The initial layer is thus advantageously only centered on the loading area, or the edge packages are advantageously only distributed at the edge of the loading area, if and when a characteristic stability value for the layer, for the entire package stack or for individual packages is worsened by not more than a predetermined percentile relative to the corresponding value given an uncentered layer, or unshifted edge packages. Otherwise, the packages of this layer are not arranged at the edge; rather, the initial layer is arranged unchanged (i.e. not dispersed) in an advantageous, stable position and orientation on the loading area.

BRIEF DESCRIPTION OF THE DRAWING

The single FIGURE is a flowchart of an embodiment of the method according the present invention.

DESCRIPTION OF THE PREFERRED EMBODIMENTS

The drawing shows the workflow of a loop of a method according to an embodiment of the present invention for the automatic palletizing of packages 1.1, . . . , 3.1 as it runs in a computer (not shown). This loop may possibly be repeated multiple times, in particular for each layer of a package stack that is to be built up from bottom to top. The leading character thereby designates (in typical tensor notation) the row of the package in the initial layer, i.e. 1.$i$ designates a package in an outermost or, respectively, edge row and 3.1 designates the first (and singular) package of the third (innermost) row.

In Step S10, a virtual initial layer of multiple packages is generated first. As can be seen in FIG. 1, a high packing density can be provided within the initial layer, and at the same time a desired goods distribution can be taken into account, for example the collection of packages 1.5, . . . , 1.12 of the same goods type.

This layer is then centered in Step S20 relative to a predetermined loading area whose outer edge 10 is indicated with a dash-double dot line in FIG. 1. Such a loading area can be, for example, a pallet on which the initial layer should be placed or an underlying layer of a previous partial package stack (which was advantageously built up in layers in the same manner). In a modification of the situation shown in FIG. 1, the loading area can also be smaller than the footprint or, respectively, envelope of the initial layer insofar as this is allowed (for example due to a non-dense packing, a corresponding contraction, i.e. inward displacement of its edge packages).

The centering can be achieved, for example, by shifting the initial layer as a whole onto the loading area, so that parallel minimum distances of parallel segments of initial layer and loading area edge 10 are of equal size. The vertical distance between the upper edges and the vertical distance between the lower edges are of equal size in FIG. 1 and the horizontal distance between the left edges and the horizontal distance between the right edges are of equal size in FIG. 1. However, the centering can also be implemented by minimization of a different distance standard, for example the distance between the center of gravity or the geometric center point of the loading area and the initial layer or its contents.

A characteristic stability value S1 with regard to the centered layer is now determined in Step S30 as results, for example, with application of a method described in DE 10 2007 001 263 A1 for the package stack with the centered layer, and is compared with a limit value that yields 95% of the characteristic stability value S0 determined according to the same method for the stack with uncentered layer or without the layer.

If the characteristic stability value S1 with regard to the centered layer falls below the limit value (S30: "N"), the packages of this layer are not arranged at the edge of the loading area; rather, the layer is arranged in a different, suitable, in particular stable position and orientation on the loading area.

Otherwise (S30: "Y"), in Step S40 all four corner packages 1.1, 1.5, 1.13 and 1.16 of the centered layer are arranged in the nearest corners of the loading area.

Free corridors K24, K612, K14, K15 and K1719 are now determined at the edge 10 of the loading area between the corner packages 1.1, 1.5, 1.13 and 1.16, which free corridors are indicated with hatching in FIG. 1.

In Step S50 the remaining edge packages 1.2, . . . 1.4, 1.6, . . . 1.12, 1.14, 1.15, 1.17 . . . 1.19 are subsequently shifted into the respective nearest corridor at the edge 10 of the loading area.

The packages 1.14, 1.15 are thereby respectively, individually shifted into the corridor K14 or, respectively, K15 associated with them and there are centered on the edge 10 relative to the corridor.

The packages 1.2, . . . 1.4, 1.6, . . . 1.12, and 1.17 . . . 1.19 are shifted in groups into the corridor K24, K612 or, respectively, K1719 associated with them and there are distributed equidistantly relative to one another at the edge 10, as is indicated by double arrows in FIG. 1. Alternatively, for the respective remaining outlying packages 1.1 and 1.4, 1.6 and 1.12 or, respectively, 1.17 and 1.19 a single corridor between the corner package and their side facing away from the corner package can also initially be determined, as this is the case with the packages 1.14, 1.15. If these packages 1.1 and 1.4, 1.6 and 1.12 or, respectively, 1.17 and 1.19 are then centered in these single corridors at the edge 10 as described with regard to 1.14, 1.15, and the method is repeated inwardly from the outside for the respective remaining, outlying edge packages, the packages can likewise be distributed at the edge, wherein only centerings with regard to one corridor have to be implemented.

In Step S60 the characteristic stability value S1 is now determined with regard to the centered layer with shifted edge packages 1.1, . . . , 1.19 and is compared with the limit value.

If the characteristic stability value S1 now falls below the limit value (S60: "N"), the packages of this layer are not arranged on the edge of the loading area; rather, the layer is arranged unseparated in the centered position on the loading area.

Otherwise (S60: "Y"), in Step S70 the inner packages 2.1, 2.10, 3.1 are also distributed. For example, for this Steps S20 through S60 can be repeated, wherein now the outermost packages 2.1, . . . , 2.10 of the inner remaining layer are shifted as new edge packages to the edge of a new loading area after removal of their edge packages 1.1, . . . , 1.19 that were shifted to the edge 10 of the loading area, which results via proportional reduction of the portion of the loading area within the edge packages 1.1, . . . , 1.19.

With or without this Step S70, the layer separated in this way, with packages 1.1, . . . , 1.19 arranged at the edge 10 of the loading area can serve as a loading area for an additional initial layer in that the loop S10→S60/S70 is run through again.

Although modifications and changes may be suggested by those skilled in the art, it is the intention of the inventors to embody within the patent warranted hereon all changes and modifications as reasonably and properly come within the scope of his or her contribution to the art.

We claim as our invention:
1. A method for automated palletizing of packages, comprising the steps of:
   providing an input to a processor defining a size of a loading area, having edges respectively connected at corners of the loading area, in which packages are to be stacked by an automated manipulator;

in said processor, generating a virtual layer comprised of multiple packages from among said packages to be stacked in said loading area;

in said processor, automatically centering said virtual layer relative to said loading area with at least some outer packages in said virtual layer located at selected locations at said edges of said loading area, thereby obtaining a centered virtual layer in said processor, and automatically assessing a stability of said centered virtual layer in said processor and generating a control signal dependent on the assessed stability; and from said processor, emitting said control signal in electronic form configured to control operation of an automated manipulator to cause packages to be stacked in a stack in said loading area dependent on the assessed stability of said centered virtual layer in said processor.

2. A method as claimed in claim 1 comprising assessing said stability of said centered virtual layer by determining a characteristic stability value of said centered virtual layer and comparing said characteristic stability value with a stability limit value, and generating said control signal dependent on the assessed stability said automated manipulator to not stack said outer packages at at least one of said edges of said loading area when said characteristic stability value of said centered virtual layer is below said stability limit value.

3. A method as claimed in claim 2 comprising generating said characteristic stability value of said centered virtual layer before centering said virtual layer relative to said loading area.

4. A method as claimed in claim 1 comprising generating said automated manipulator from said processor control signal dependent on the assessed stability of said centered virtual layer to cause said manipulator to stack said packages spaced from each other in said loading area to cause said at least some outer packages to be located at said selected locations.

5. A method as claimed in claim 4 comprising, in said processor, automatically determining a further characteristic stability value respectively for said packages spaced apart from each other in said loading area and comparing said further characteristic stability value to a further limit value, and generating said control signal dependent on the assessed stability to cause said automated manipulator to not stack said packages at said at least one of said edges of said loading area if said further characteristic stability value is below said further limit value.

6. A method as claimed in claim 5 comprising employing a value, as said further limit value, determined for said virtual layer with unshifted packages at said at least one of said edges of said loading area.

7. A method as claimed in claim 4 comprising generating said control signal dependent on the assessed stability said automated manipulator to place packages at respective corners of said loading area corresponding to packages at respective corners of said centered virtual layer.

8. A method as claimed in claim 4 comprising, in said processor, defining a corridor at at least one of said edges of said loading area and including said corridor in said virtual layer, and generating said control signal dependent on the assessed stability to cause said automated manipulator to place packages in an actual corridor of the loading area corresponding to the corridor in the virtual layer.

9. A method as claimed in claim 8 comprising generating said control signal dependent on the assessed stability to cause said automated manipulator to distribute packages equidistantly from each other in said actual corridor of said loading area.

10. A method as claimed in claim 8 comprising generating said control signal dependent on the assessed stability to cause said automated manipulator to distribute packages with respect to a center of said actual corridor in said loading area.

11. A method as claimed in claim 1 comprising generating said control signal dependent on the assessed stability to cause said automated manipulator to distribute some of said outer packages at respective edges of said loading area and to center a remainder of said packages within said outer packages in said loading area.

12. A non-transitory computer-readable medium encoded with programming instructions and loaded into a computerized control unit of a manipulator system, comprising an automated manipulator operated by the control unit, said programming instructions causing said computerized control unit to:

receive an input defining a size of a loading area, having edges respectively connected at corners of the loading area, in which packages are to be stacked by an automated manipulator;

generate a virtual layer comprised of multiple packages from among said packages to be stacked in said loading area;

automatically center said virtual layer relative to said loading area with at least some outer packages in said virtual layer located at selected locations at said edges of said loading area, thereby obtaining a centered virtual layer in said processor, and automatically assess a stability of said centered virtual layer in the control unit and generate a control signal dependent on the assessed stability; and emit said control signal in electronic form configured to control operation of the automated manipulator to cause packages to be stacked in a stack in said loading area dependent on the assessed stability of said centered virtual layer in said control unit.

* * * * *